No. 756,849. PATENTED APR. 12, 1904.
G. B. GWYNES.
PLOW POINT.
APPLICATION FILED APR. 11, 1903.
NO MODEL. 3 SHEETS—SHEET 1.
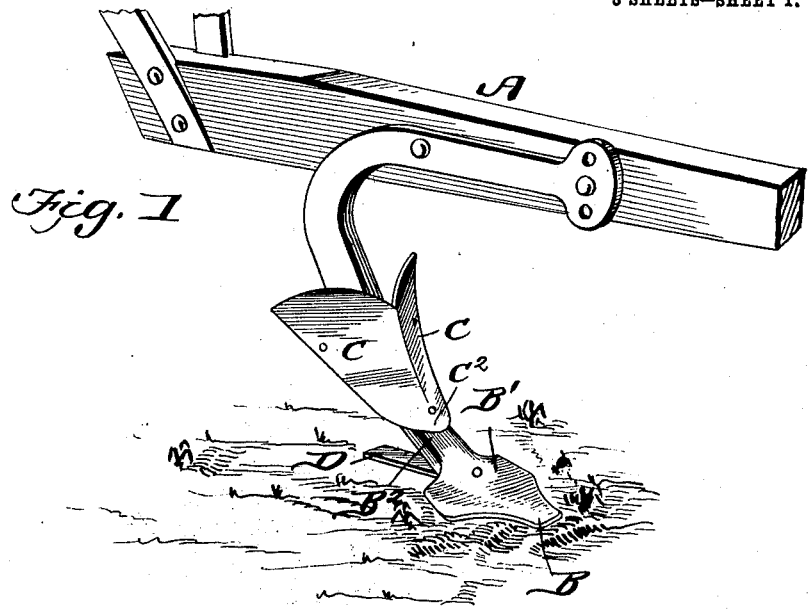
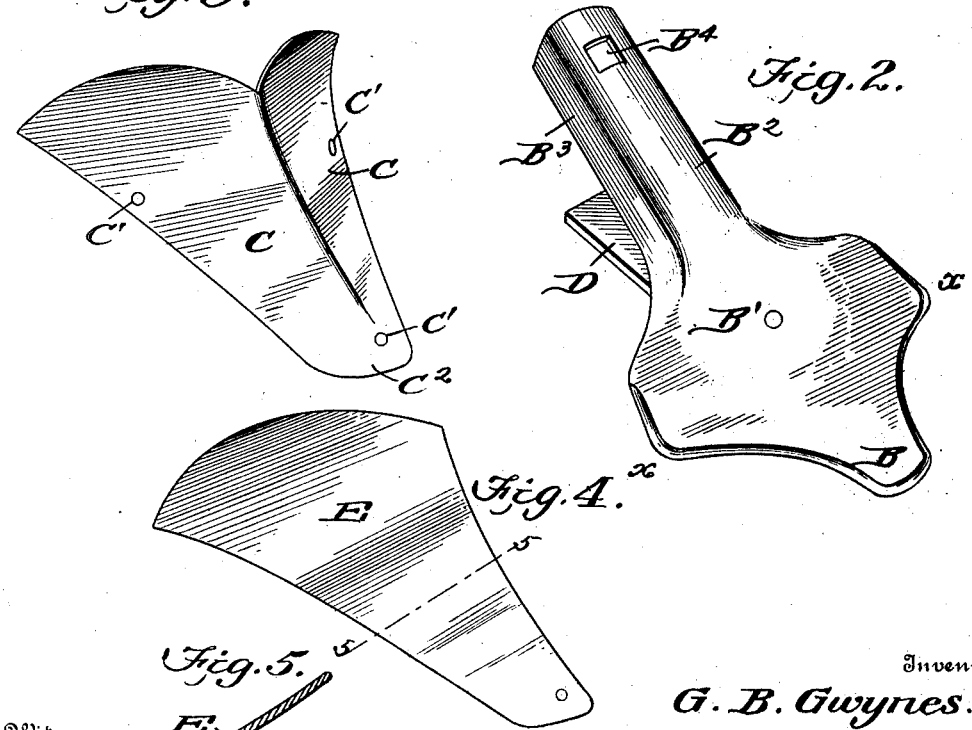
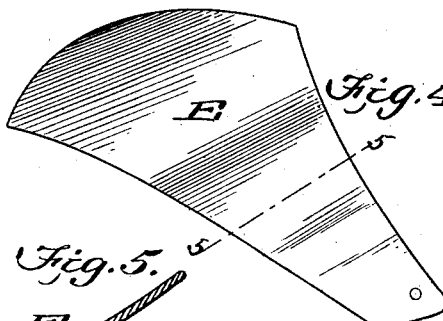
Inventor
G. B. Gwynes.

No. 756,849. PATENTED APR. 12, 1904.
G. B. GWYNES.
PLOW POINT.
APPLICATION FILED APR. 11, 1903.
NO MODEL. 3 SHEETS—SHEET 2.
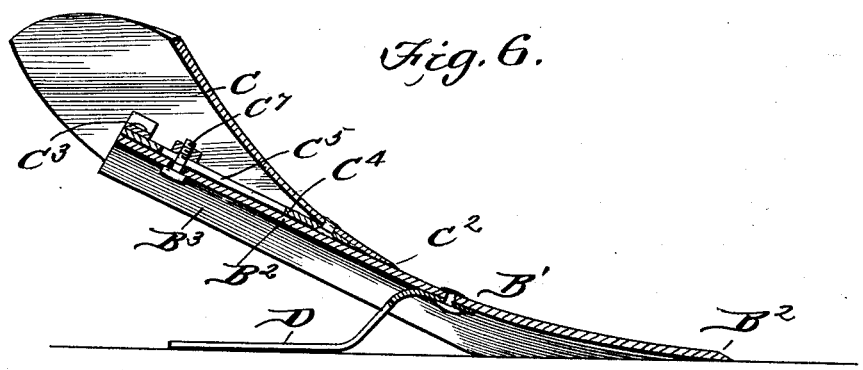
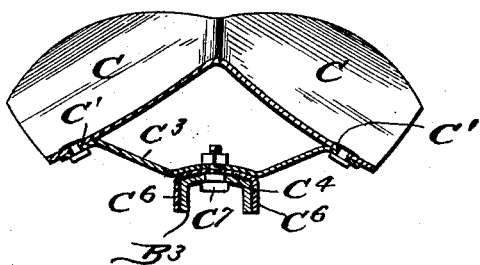
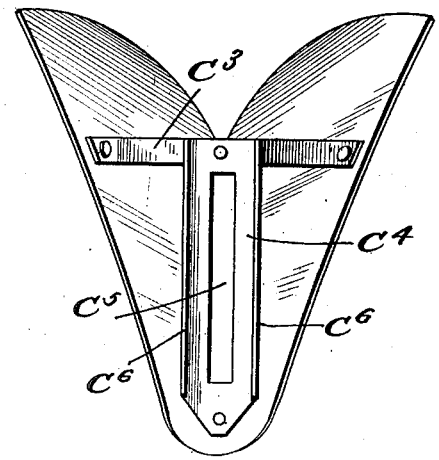
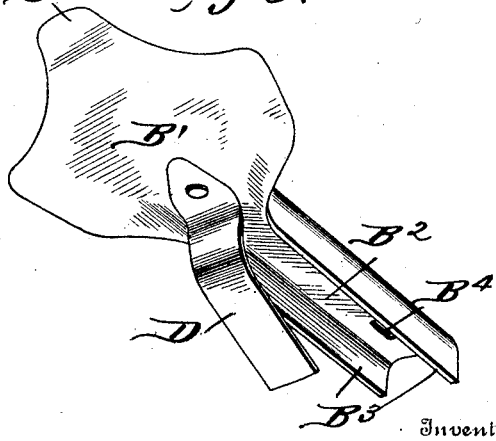
Inventor
G. B. Gwynes.

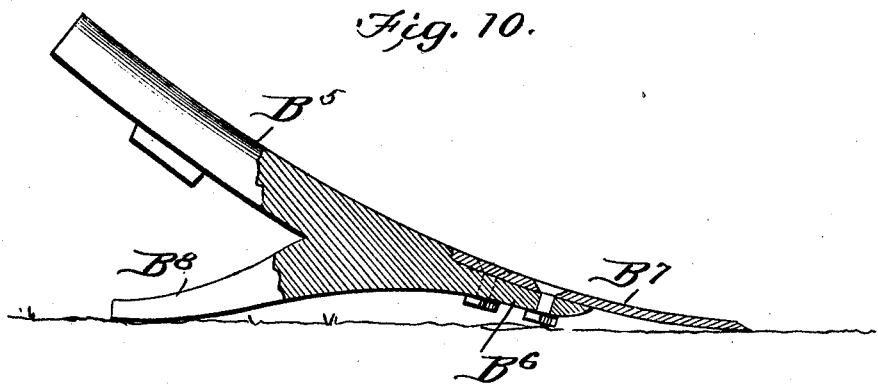
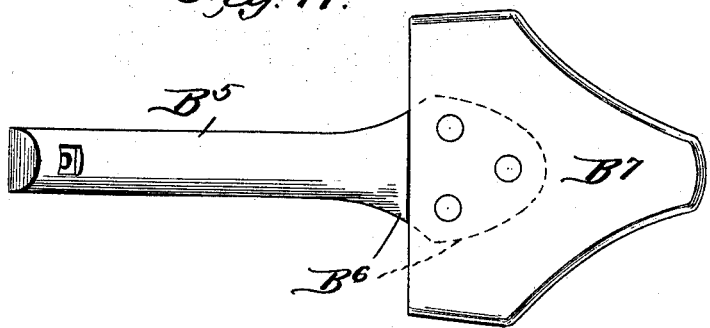
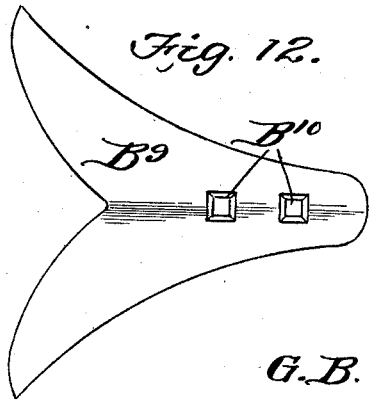

No. 756,849. Patented April 12, 1904.

UNITED STATES PATENT OFFICE.

GEORGE B. GWYNES, OF AMERICUS, GEORGIA.

PLOW-POINT.

SPECIFICATION forming part of Letters Patent No. 756,849, dated April 12, 1904.

Application filed April 11, 1903. Serial No. 152,211. (No model.)

*To all whom it may concern:*

Be it known that I, GEORGE B. GWYNES, a citizen of the United States, residing at Americus, in the county of Sumter and State of Georgia, have invented a new and useful Plow-Point, of which the following is a specification.

My invention relates to an improvement in plow-points, and has for its object the construction of a point adapted to be used on the ordinary iron foot-plow either with or without a moldboard and one which when used without a moldboard or other attachment answers for a subsoil-plow. With a scrape attached it is adapted for use as a cultivator in working corn, cotton, or other crops, and with the double moldboard it is used as a double subsoil-plow and in this use has special advantages, which will be particularly pointed out later on.

The invention consists in the novel features of construction and combination which will be fully described hereinafter, and pointed out in the claims.

In the accompanying drawings, Figure 1 is a perspective view of my device complete and attached to a plow-stock. Fig. 3 is a perspective view of the point. Fig. 2 is a perspective view of the double moldboard. Fig. 4 is a similar view of the single moldboard. Fig. 5 is a detail section of the single moldboard on about the line 5 5 of Fig. 4. Fig. 6 is a longitudinal section showing point-runner and double moldboard. Fig. 7 is a transverse section taken through the upper portion left-hand side of Fig. 6. Fig. 8 is an inverted plan view of the double moldboard. Fig. 9 is a perspective view of the under side of the point, showing the runner. Fig. 10 is a view showing point and solid stem. Fig. 11 is a plan view of the form shown in Fig. 10. Fig. 12 is a modified form of point showing square bolt-holes.

In the drawings, A represents an ordinary plow-beam, and B my improved point. The point comprises in one piece three portions—the thin flattened almost horizontal obtuse point proper, B, the laterally-widened upwardly and rearwardly inclined body portion B', and the straight, upwardly and rearwardly extending stem $B^2$. It will be especially noted that the body portion gradually increases in width from the stem and has its greatest width between the points $x$ $x$ of Fig. 2, from which points an inward curve on each side brings it to the point B. The stem being narrow, a body portion of this shape throws the subsoil rearward past the stem instead of to one side or turning it over. It may be stated here that one of the main objects of a point so constructed is to loosen and break up the subsoil, stirring it thoroughly, but not raising it to the surface, as in such case it would speedily lose its moisture. The outline of the portion B' is especially adapted to aid in the work of cutting through the subsoil and then permitting it to slide to the rear on each side of the stem without throwing it to the surface. The stem has on each side a longitudinal downwardly-extending flange $B^3$, which strengthens the stem without greatly increasing its weight, though a solid stem may be used, if desired, especially in plows of very large size.

The upper portion of the stem has a rectangular bolt-opening $B^4$. The double moldboard comprises the two integral outwardly and rearwardly curved wings C, having apertures, as at C', and tapering to a curved point $C^2$ at its forward end. A cross-piece $C^3$ is bent in its middle portion to fit the upper face of the stem $B^2$, and on each side of said central portion it is bent upwardly and outwardly to the wings, the ends of the piece being bent parallel to the wings and resting against their under surface adjacent the lateral edge of each wing and are secured thereto by suitable bolts.

Secured at one end to the under side of the central portion of the cross-piece and at its opposite end to the under side of the moldboard adjacent the point is a plate $C^4$, longitudinally slotted at $C^5$ and having downwardly-extending flanges $C^6$, the piece $C^4$ being adapted to fit over the stem $B^2$. A suitable bolt $C^7$ passes through the opening $B^4$ and slot $C^5$, the slot permitting adjustment of the plate, and consequently the moldboard, on the stem.

Secured to the under side of the portion B' is a runner D, bent downwardly and extending rearwardly in the plane of the point B. This runner will regulate the depth at which the point will work and keeps it steady and easy to hold. The single moldboard E is substantially of the same size and shape as one wing of the double board and is secured to the stem in practically the same manner.

The operation of my device has already been partially explained; but it will be further noted that there is a space between the lower end of the moldboard and the portion B' of the plow, and thus the subsoil passes over the point around the stem and between the portion B' and the moldboard and is not turned up to the surface, the wings of the moldboard in the meantime turning over the surface soil. The narrow stem also reduces the draft and makes the work easier on the stock.

When a solid stem is used, as shown in Fig. 10, the point and stem are separate, the stem $B^5$ terminating in a flattened head $B^6$, bolted or otherwise secured to the under side of the point $B^7$. This stem $B^5$ has integral with it a runner $B^8$. In Fig. 12 a double wing $B^9$ is shown which is secured to the plow-stock by heel-bolts passing through the square bolt-holes $B^{10}$, which are formed in the ridge of the point.

Having thus fully described my invention, what I claim as new, and desire to secure by Letters Patent, is—

1. In a plow, the combination with a point having a central body part widest in its forward portion and tapering to a rearwardly, upwardly extending stem, a moldboard adapted to be adjustably secured to the stem, and a rearwardly-extending runner secured to the under side of the stem.

2. In a plow, the combination with a point having an upwardly-extending apertured stem, a double-winged moldboard, a cross-piece on the under side of said board, a longitudinally-slotted plate secured at one end to the cross-piece and at the opposite end to the board, said plate having lateral, downwardly-extending flanges adapted to fit over said stem, and means for adjustably securing said plate to the stem.

G. B. GWYNES.

Witnesses:
   Thos. M. Allen,
   T. A. Graham.